(12) United States Patent
Wang et al.

(10) Patent No.: US 6,503,421 B1
(45) Date of Patent: Jan. 7, 2003

(54) ALL POLYMER PROCESS COMPATIBLE OPTICAL POLYMER MATERIAL

(75) Inventors: Jianguo Wang, Horseheads, NY (US); Paul John Shustack, Elmira, NY (US); Julie Ann Chalk, Hickory, NC (US)

(73) Assignee: Corning Incorporated, Corning, NY (US)

( * ) Notice: Subject to any disclaimer, the term of this patent is extended or adjusted under 35 U.S.C. 154(b) by 142 days.

(21) Appl. No.: 09/704,116

(22) Filed: Nov. 1, 2000

(51) Int. Cl.[7] .............................. F21V 9/00; C08F 2/46; C08F 114/18; G02B 6/02

(52) U.S. Cl. ................. 252/582; 522/167; 526/243; 526/245; 526/248; 526/256; 526/262; 385/123; 385/145; 359/115; 359/237; 359/321; 359/333

(58) Field of Search ................. 526/243, 245, 526/248, 256, 262; 385/123, 145; 359/115, 237, 321, 333; 252/582; 522/167

(56) References Cited

U.S. PATENT DOCUMENTS

| | | | | |
|---|---|---|---|---|
| 4,661,574 A | * | 4/1987 | Younes | 526/262 |
| 4,683,084 A | * | 7/1987 | Younes | 526/262 |
| 5,328,971 A | * | 7/1994 | Blevins et al. | 526/262 |
| 5,405,670 A | * | 4/1995 | Wetzel et al. | 526/262 |
| 6,314,225 B1 | * | 11/2001 | Wang | 385/123 |

OTHER PUBLICATIONS

Hult et al.—Low–Loss Passive Optical Waveguides Based on Photosensitive Poly(pentafluorostyrene–co–glycidyl methacrylate)—Macromolecules (1999), vol. 32, pp. 2903.
Brauer et al.—"Polymer for Passive and Switching Waveguide Components for Optical Communication",SPIE Critical Reviews, vol. CR68 (1997).

(List continued on next page.)

Primary Examiner—Philip Tucker
(74) Attorney, Agent, or Firm—Foley & Lardner

(57) ABSTRACT

A terploymer containing N-halogenated phenyl maleimide units or N-halogenated phenyl bismaleimide units, one or more second units selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates and one or more third units comprising a monomer containing both a free radically polymerizable group and cationic ring opening polymerizable group, is prepared by radical co-polymerization. The resulting linear plastic polymer group contains a UV, or e-beam curable ring opening polymerizable functional groups. Such plastic polymer is then blended with cationic photoiniator and processed into optical waveguide structures using a hot embossing technique. The terpolymer is subsequently crosslinked by exposure to UV or E-beam radiation and thermal post-bake. Alternatively, in a direct contact photolithographic process, the terpolymer is mixed with cationic photoinitiator, and deposited or coated onto a substrate. Then optical waveguide structures are formed by exposing the terpolymer to UV or E-beam radiation through a photomask. After thermal postbake, the exposed area of the photopolymer is chemically crosslinked. The unexposed area is washed away with solvent. The terpolymer is fully compatible with polymer processes such as micromolding, hot-embossing, coating and direct contact photolithography processes to fabricate polymer waveguide devices. The crosslinked polymer waveguides have low optical loss, good thermal and environmental stability and low coefficient of thermal expansion.

22 Claims, 13 Drawing Sheets

OTHER PUBLICATIONS

Elada et al.—"Next Generation Polymer Photonic Devices in Sol–Gel and Polymer Photonic Devices", SPIE Critical Reviews, vol. CR68 (1997).

Andreas Bräuer and Peter Dannberg, *Polymers for Passive and Switching Waveguide Components for Optical Communication*, SPIE Critical Reviews, 1996, pp. 334–349, vol. CR63.

Louay Eldada et al., *Next–generation polymeric photonic devices*, SPIE Critical Reviews, 1997, pp. 207–227, vol. CR68.

Claire Pitois et al., *Low–Loss Passive Optical Waveguides Based on Photosensitive Poly(pentafluorostyrene–co–glycidyl methacrylate)*, Macromolecules, 1999, pp. 2903–2909, vol. 32.

Narayan Sundararajan et al., *Supercritical $CO_2$ Processing for Submicron Imagining of Fluoropolymers*, Chem. Mater., 2000, pp. 41–48, vol. 12, No. 1.

H. Kogelnik, *Theory of Optical Waveguides*, Guided–Wave Optoelectronics, Springer Series in Electronics and Photonics 26, 1990, pp. 7–88, Second edition, New York.

\* cited by examiner

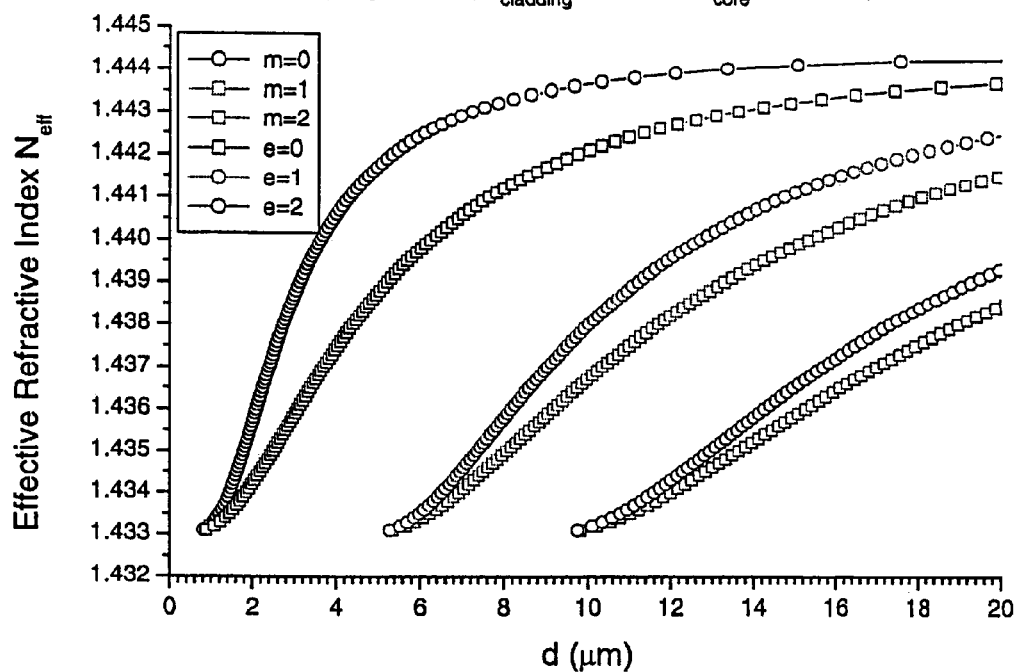
Fig. 1a Typical theroretical curves for TE and TM modes for fluorinated maleimide copolymers ($N_{cladding}$=1.433, $N_{core}$=1.4445)
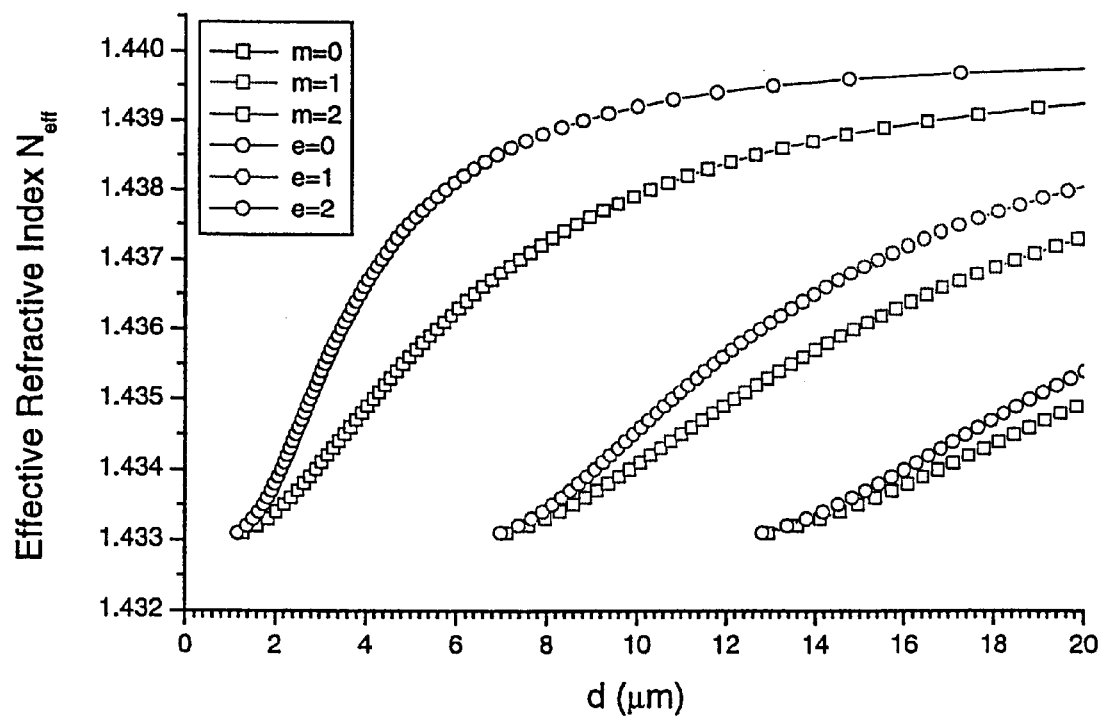
Fig. 1b Typical theroretical curves for TE and TM modes for fluorinated maleimide copolymers ($N_{cladding}$=1.433, $N_{core}$=1.440)

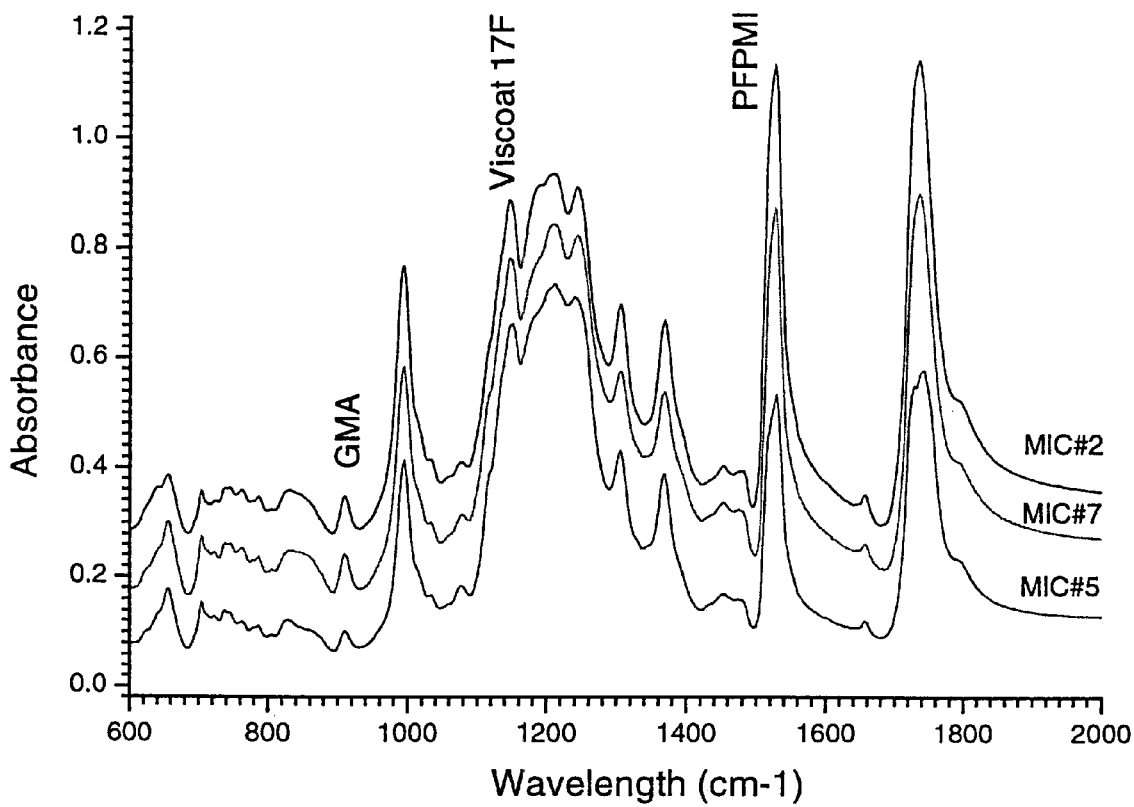
Fig. 2 FTIR spectra of fluorinated maleimide terpolymers

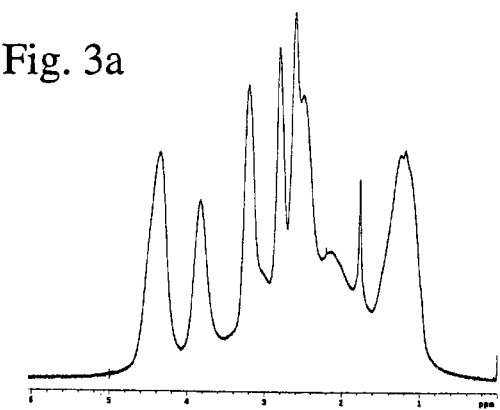
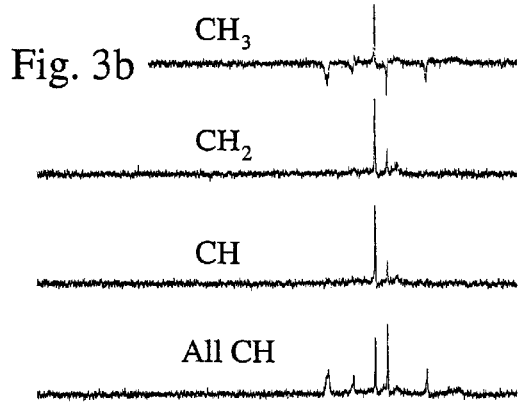
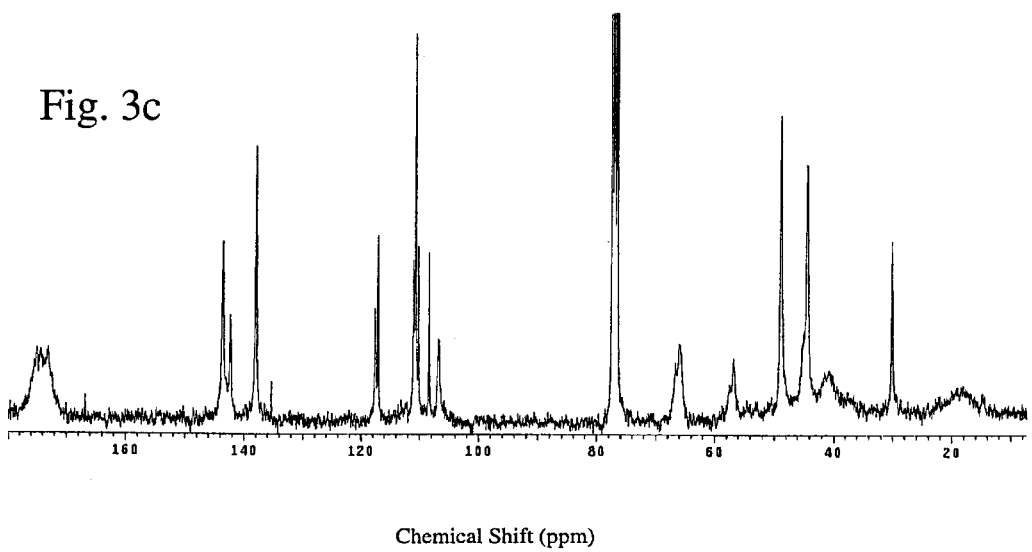
Fig. 3 NMR spectra of fluorinated maleimide terpolymer MIC#4, a) $^1$H NMR spectrum, b) $^{13}$C NMR DEPT spectrum, c) Quantitative $^{13}$C NMR spectrum

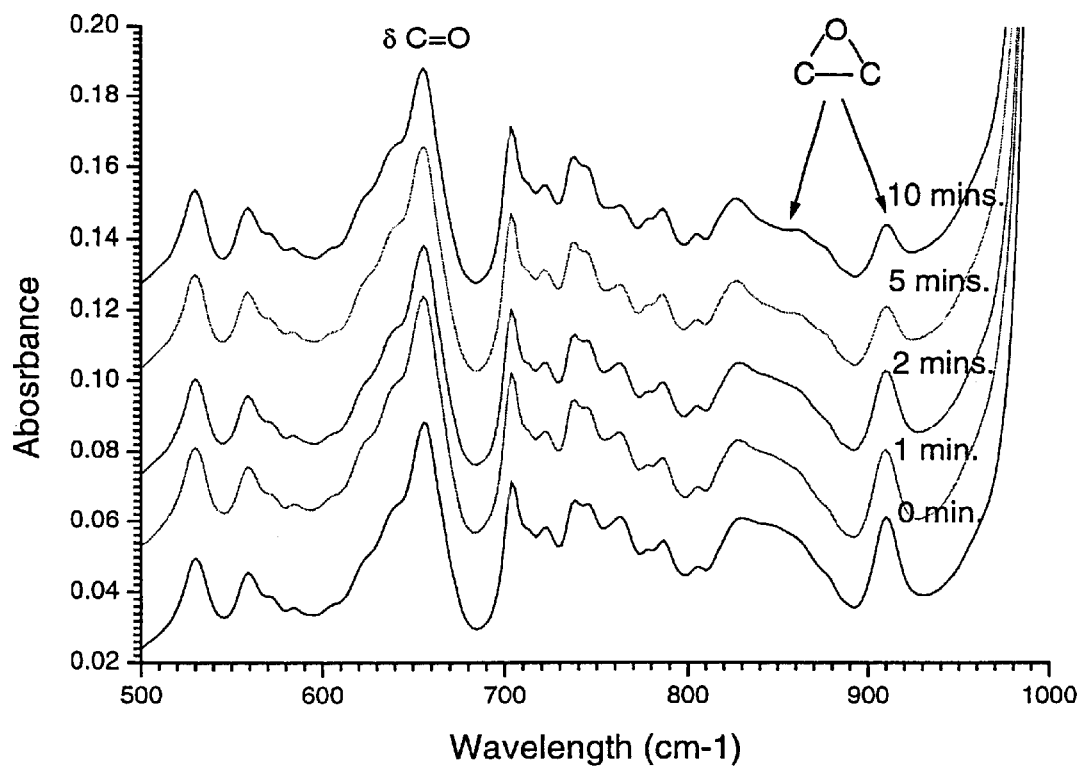
Fig. 4 FTIR spectra of MIC#4 from different postbaking time at 150 °C

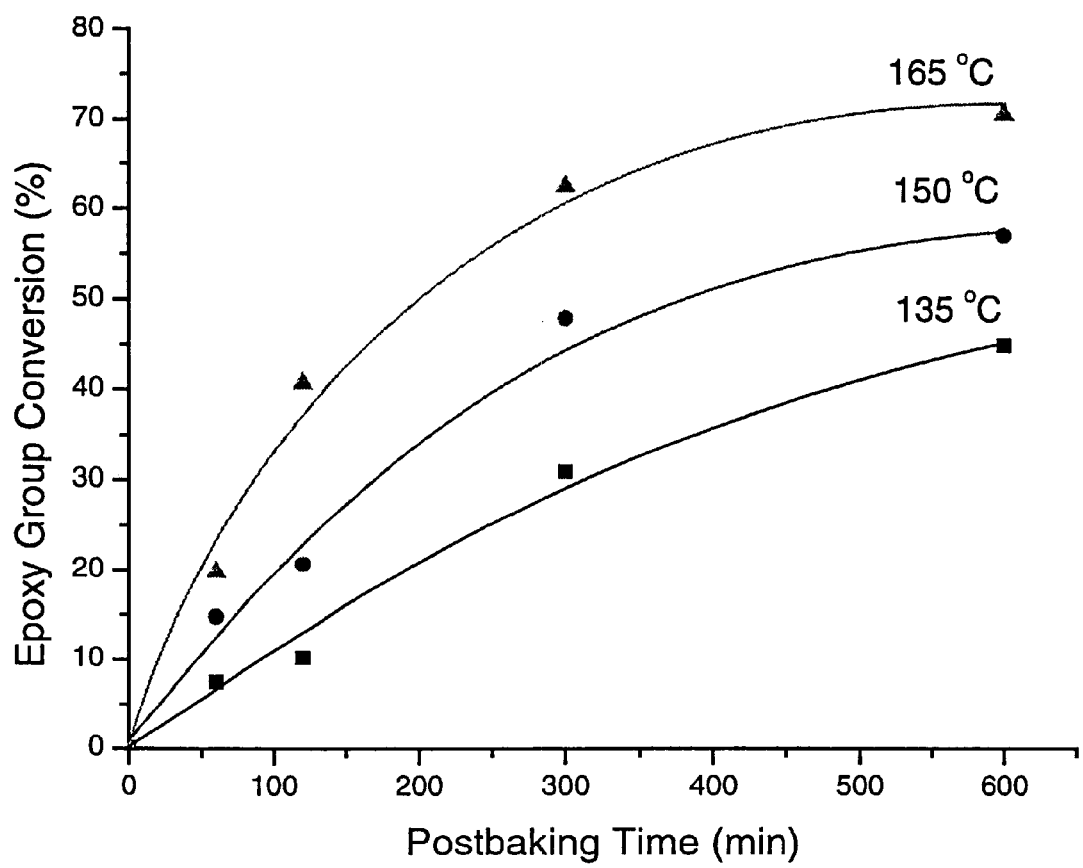
Fig. 5 Curing rates of MIC#4 at different postbaking temperature

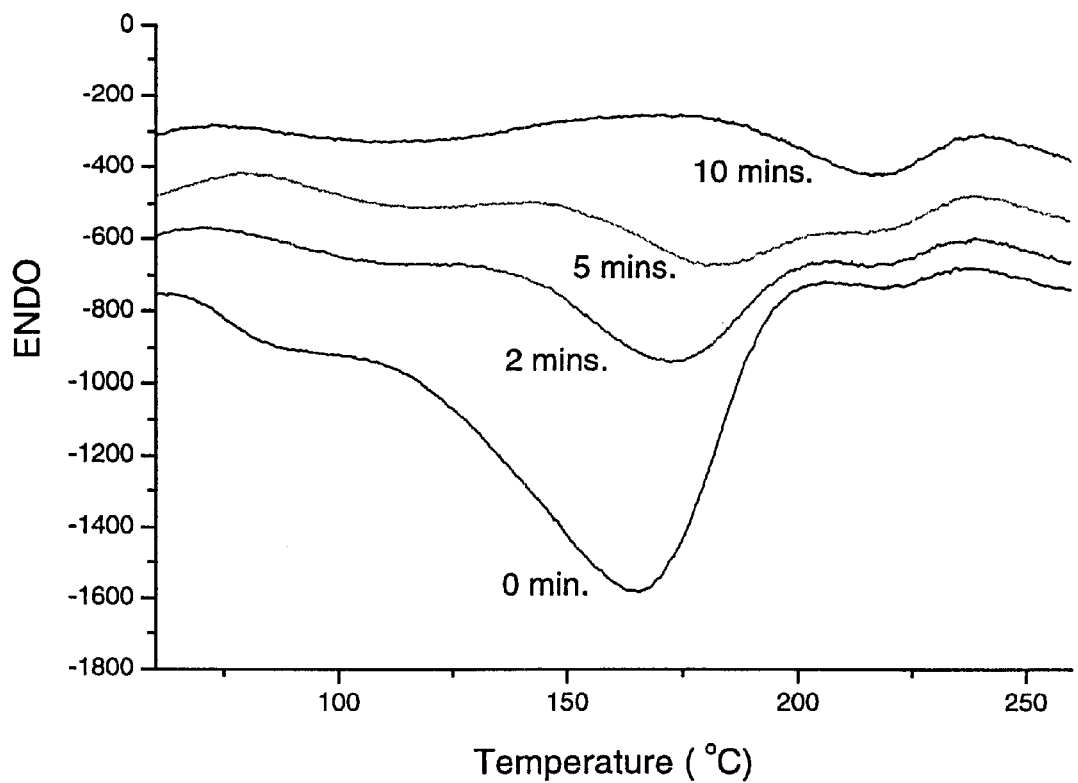
Fig.6 DSC curves of MIC#4 postbaking at 150 °C for different time

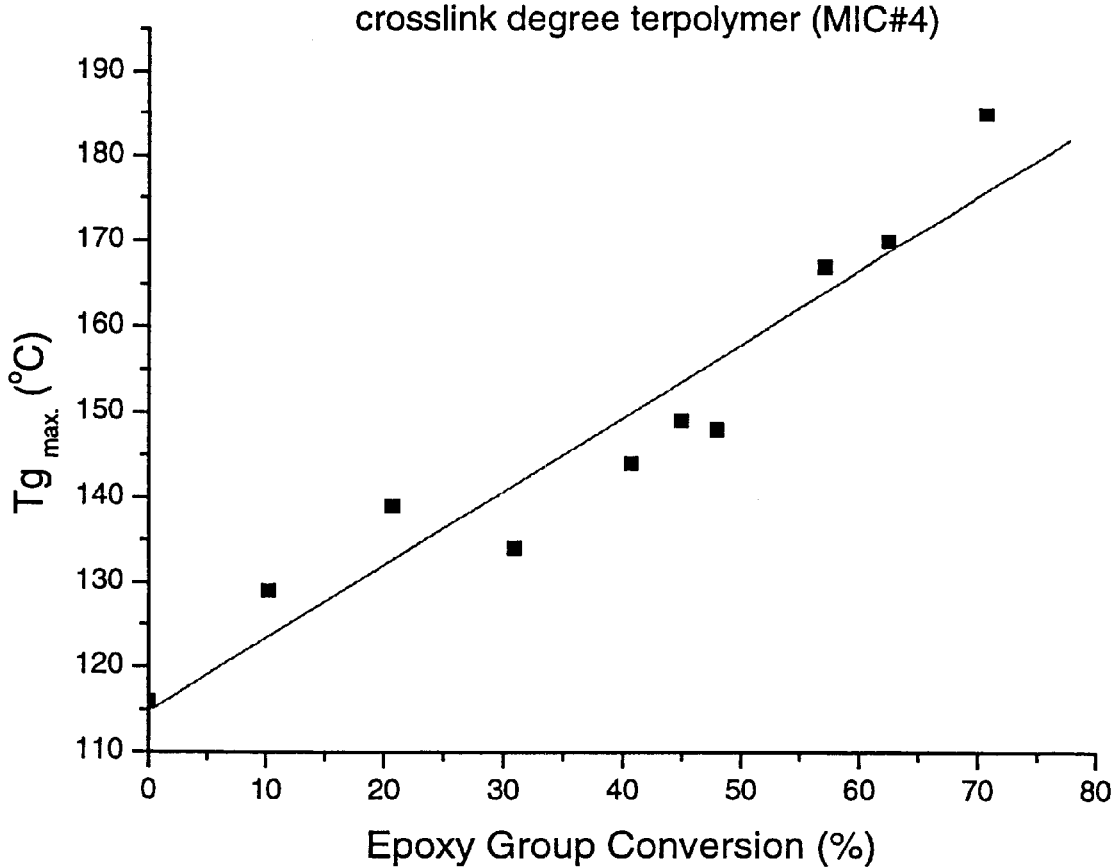
Fig. 7 Maximal glass transition temperature of different crosslink degree terpolymer (MIC#4)

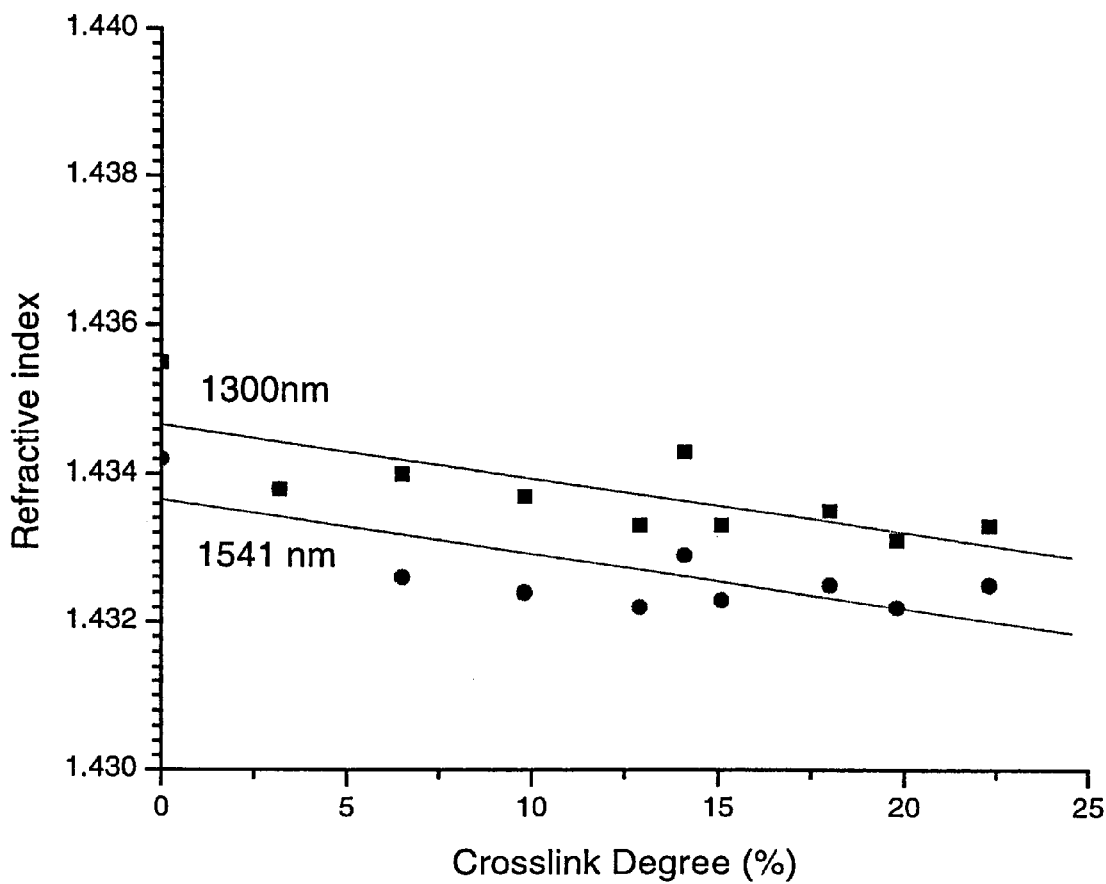

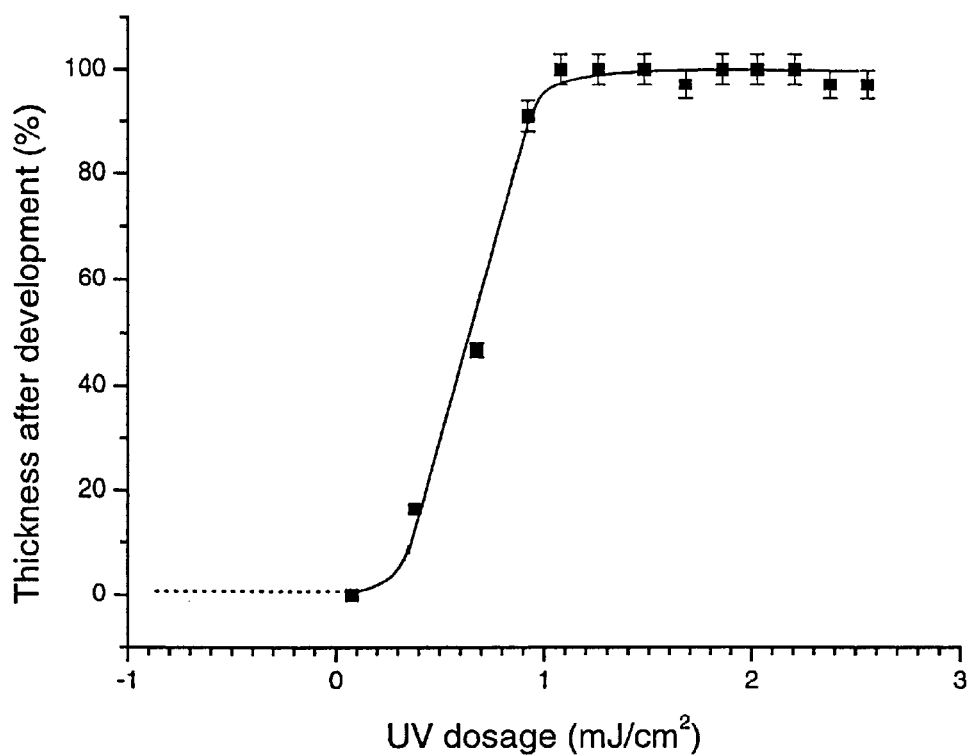
Fig. 9 Sensitivity curve of fluorinated maleimide terpolymer resist MIC #2

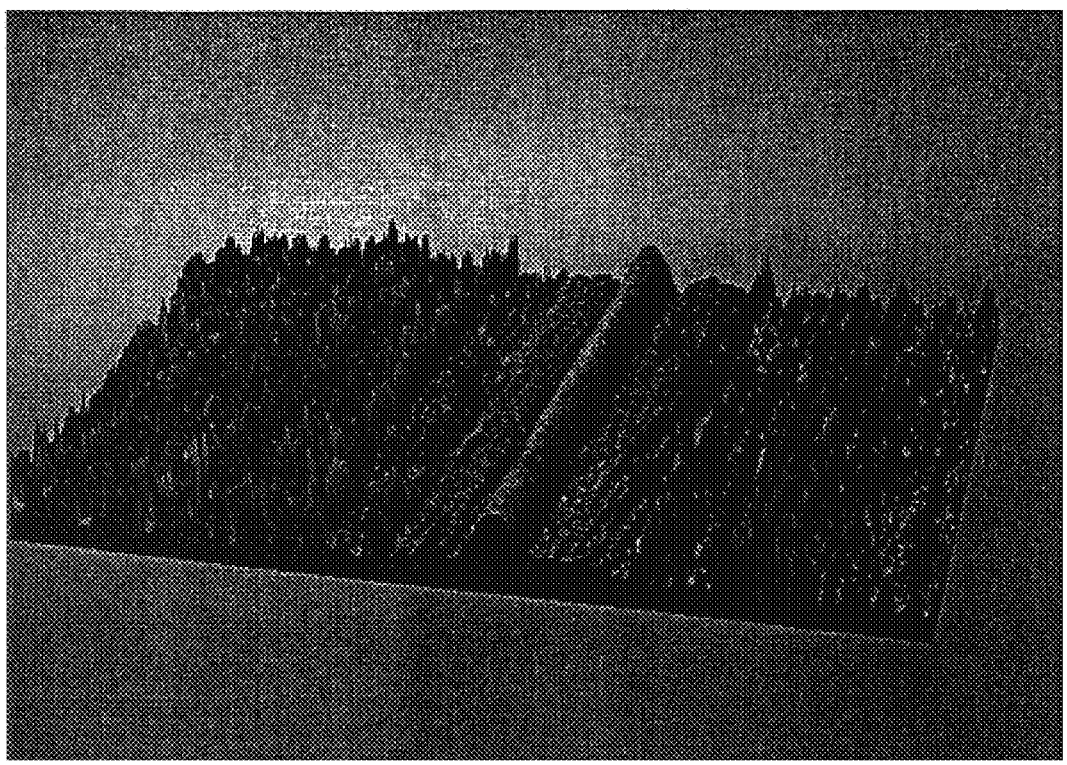
Fig.10 A under-developed photoresist micrography of straight waveguide

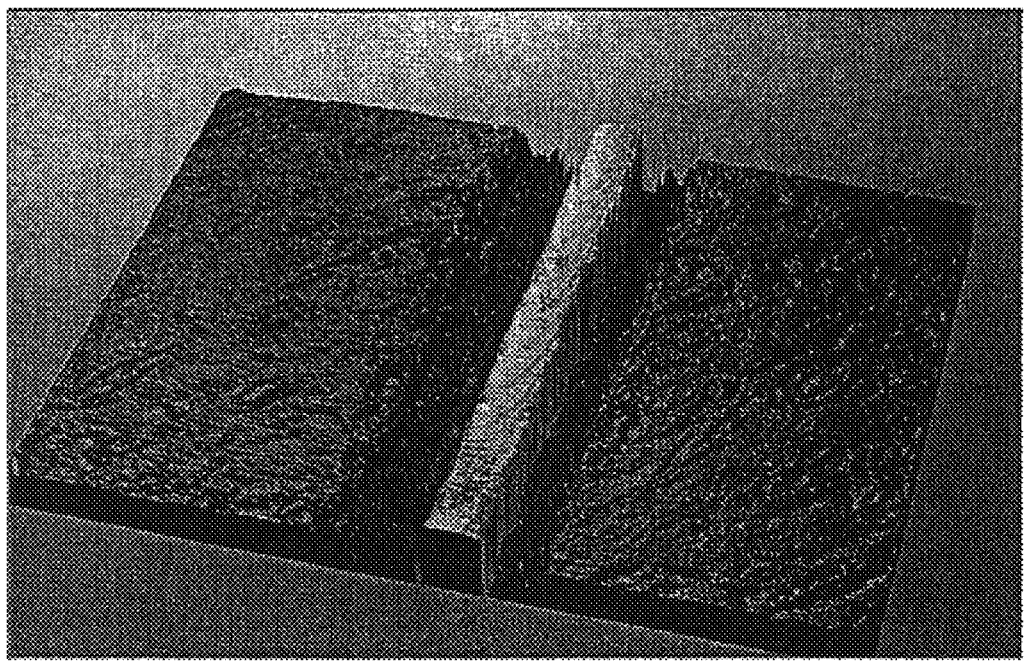
Fig. 11 3D surface profile of straight waveguide from photolithographic process of fluorinated maleimide terpolymers

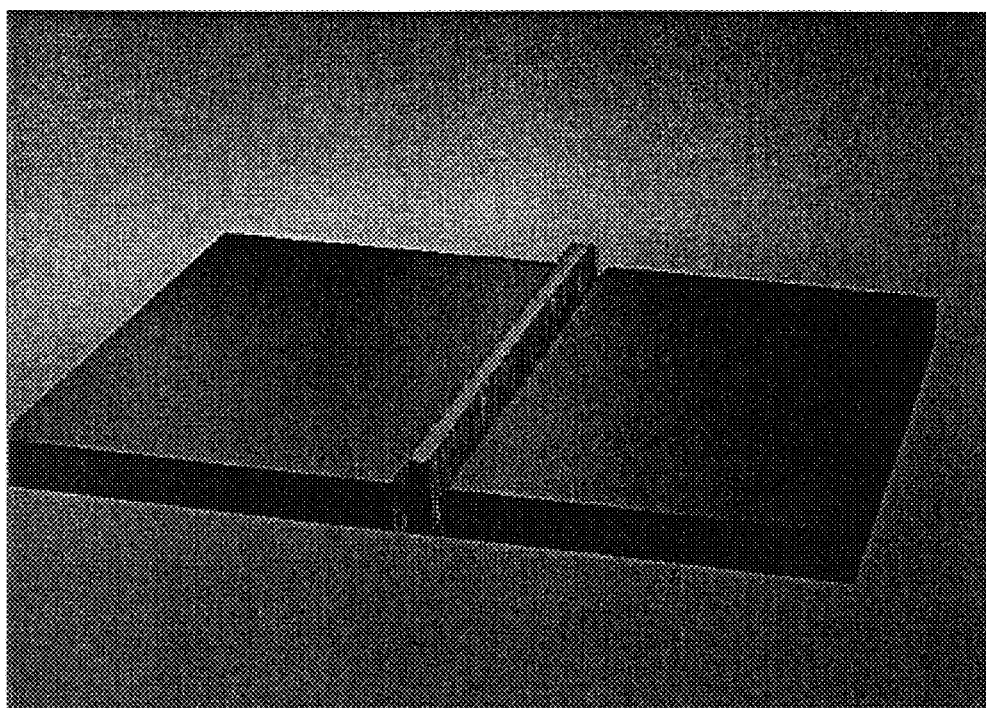
Fig. 12  3D surface profile of straight waveguide from hot-embossing process of fluorinated maleimide terpolymers.

Negative Photolithographic Process

Coating of cladding

UV and post-baking

Coating of Core

UV under Mask + Postbaking

Develop in MEK

Over cladding +UV + postbaking

Hot-Embossing/UV Curing Process

Coating of cladding

UV and post-baking

Coating of Core

Hot-embossing

UV and Post-baking

Over cladding +UV + postbaking

ALL POLYMER PROCESS COMPATIBLE OPTICAL POLYMER MATERIAL

BACKGROUND OF THE INVENTION

1. Field of the Invention

The present invention relates to a low optical loss, highly crosslinked and all polymer process compatible fluorinated maleimide based optical polymer system. The invention also relates to methods of making such polymers and single or multi-mode polymer waveguide structures fabricated by photolithography, hot-embossing and UV curing of the materials.

2. Description of the Related Art

The microelectronic and optical industries rely on hundreds of polymeric materials. Polymeric material currently play an important role in, for example, photonic devices coating materials, and electro-optical devices.

The high speed and high capacity data transmission of the internet makes it possible for everyone to communicate to the world simply through their fingers. With the explosive increased demand for information exchange, there is also a tremendous market driving force pushing all the communication units to their lowest possible price. The future information highway is expected to have an all-optical interconnection because of its great potential to reduce the cost. The application of polymer interconnection in the micro-optical industry has been attracting great attention because of a significant potential cost-savings from various convenient polymer processes. The mass production of polymer components from micro-photolithographic processes and micro hot-embossing processes are a few areas needing to be addressed. So far, many polymer based optical devices have been demonstrated such as polymer waveguides, polymer optical couplers, polymer optical power splitters, polymer wavelength switches, polymer wavelength bragg filters, polymer thermal optical attenuators and polymer planar amplifiers etc. See, for example, Brauer et al., "Polymer for Passive and Switching Waveguide Components for Optical Communication" *SPIE Critical Reviews*, vol. CR63 (1996) and Elada et al., "Next Generation Polymer Photonic Devices in Sol-Gel and Polymer Photonic Devices" *SPIE Critical Reviews* Vol. CR 68 (1997). However, from a material and process point of view, there are several issues that limit the polymeric materials that can be used. One is the relatively high optical loss at the near IR region because of the C—H overtone absorption. The second problem is the thermal and environmental stability of polymers compared to the existing competitive inorganic based silicate materials. Also, the polymer microfabrication process itself significantly narrows down the choice of optical polymers. For example, the photolithography process limits the selection of polymers to organic solvent or alkaline solvent soluble hydrocarbon photoresists. This creates an optical loss issue. The hot embossing process is applicable only to thermoplastic polymers. This creates a thermal stability problem from the large coefficient of thermal expansion (CTE).

The microlithographic process, a powerful process to manufacture millions of computer chips, is the "workhorse" of the current microelectronic industry. Seeking the advantages of polymer microfabrication process in optical communication industry, a low optical loss photoresist could be one of the smartest choices for fabricating the micro-optical components because the same production line at the semiconductor industry could be directly applied. Logically, it is easy to realize that a crosslinkable negative photoresist must be a better candidate because of good thermal stability in contrast with many linear positive photoresist resins. The problem is that most organic photoresists are hydrocarbon polymers which have a very high optical loss. On the other hand, fluorinated photoresists may have lower optical loss but are hardly soluble in common organic solvents and have to be processed in supercritical carbon dioxide. Most recently, Hult et al., "Low-Loss Passive Optical Waveguides Based on Photosensitive Poly(pentafluorostyrene-co-glycidyl methacrylate)" *Macromolecules*, vol. 32 pages 2903 (1999), developed a fluorine containing copolymer, poly-(pentafluorostyrene-coglycidyl methacrylate), to fabricate the low loss optical waveguides based on the photosensitive reaction. These polymer waveguides have a higher refractive index (~1.48 at 1550 nm) than silica (1.44 at 1550 nm) and low glass transition temperature (<100° C.) even after the crosslink reaction.

An alternative process is to utilize a traditional plastic polymer structure formation process such as hot-embossing or injection molding. However, the inherent higher coefficient of thermal expansion (CTE) of plastic polymers (100–300 ppm) makes it near impossible to meet requirements for optical devices. It is also difficult for these polymers to pass other harsh environmental tests such as exposure to 85% relative humidity and 85° C.

Thus, there is a need for a polymeric material which has a low optical loss, has a low coefficient of thermal expansion and is capable of processing by UV curing, photolithography, and hot embossing as well as other polymeric processes to produce optical devices.

SUMMARY OF THE INVENTION

According to an embodiment of the present invention, there is provided a terpolymer containing N-halogenated phenyl maleimide units or phenyl bismaleimide units (I), one or more second units (II) selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates and one or more third units (III) comprising a monomer containing both a free radically polymerizable group and a cationic ring opening polymerizable group. This terpolymer is prepared by radical polymerization.

Also, in accordance with another embodiment of the invention, there is provided an optical device, formed via one or more polymer processing steps of a terpolymer containing N-halogenated phenyl maleimide units or phenyl bismaleimide units (I), one or more second units (II) selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, and halogenated crotonates and one or more third units (III) comprising a monomer containing both a free radically polymerizable group and a cationic ring opening polymerizable group. The terpolymer is prepared by radical polymerization. The polymer processing steps are selected from the group consisting of microphotolithography, micro hot-embossing, micro-molding, spin-molding, UV curing, injection molding and spin-coating.

The invention provides polymers useful in processes for producing optical devices that overcome one or more of the deficiencies, such as those discussed above, of currently used polymers. It also provides methods of making terpolymers and using such polymers to produce optical devices.

Additional, features and advantages of the invention will be set forth in the description which follows, and in part will be obvious from the description, or may be learned by practice of the invention. The advantages of the invention may be realized and obtained by means of the instrumentalities and combinations particularly pointed out in the appended claims.

BRIEF DESCRIPTION OF THE DRAWINGS

FIG. 1a is a graph of typical theoretical curves for $T_E$ and $T_M$ modes for fluorinated maleimide copolymers, wherein $N_{cladding}=1.433$ and $N_{core}=1.4445$.

FIG. 1b is a graph of typical theoretical curves for $T_E$ and $T_M$ modes for fluorinated maleimide copolymers, wherein $N_{cladding}=1.433$ and $N_{core}=1.440$.

FIG. 2 is a FTIR spectra of fluorinated maleimide terpolymers (samples MIC#2, 5, and 7).

FIG. 3a is a $^1$H NMR of fluorinated maleimide terpolymer (MIC#4).

FIG. 3b is a $^{13}$C NMR DEPT spectrum.

FIG. 3c is a quantitative $^{13}$C NMR spectrum.

FIG. 4 is a FTIR spectra of terploymer MIC#4 sample from different postbaking time at 150° C.

FIG. 5 is a graph of curing rates of terpolymer MIC#4 at different postbaking temperatures.

FIG. 6 is a graph of DSC curves of terpolymer MIC#4 postbaking at 150 degrees for different times.

FIG. 7 is a graph of maximal glass transition temperature of different degrees of crosslinked terpolymer MIC #4.

FIG. 8 is a graph of the refractive index of a crosslinked terpolymer according to the invention.

FIG. 9 is a graph of the sensitivity curve of fluorinated maleimide terploymer resist MIC #2.

FIG. 10 is a photomicrograph of an under-developed photoresist of a straight waveguide.

FIG. 11 is a photomicrograph showing a 3D surface profile of a straight waveguide made of fluorinated maleimide terpolymer prepared from a photolithographic process.

FIG. 12 is a photomicrograph showing a 3D surface profile of a straight waveguide made of fluorinated maleimide terpolymer prepared by a hot embossing process.

DETAILED DESCRIPTION OF THE PREFERRED EMBODIMENTS

Figure 13A:
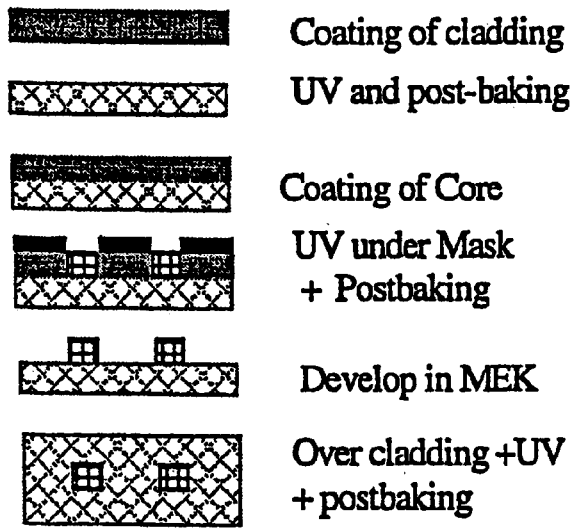
FIG. 13a is a scheme showing the process flow of polymer waveguides in a negative photolithographic process.

The present invention provides terpolymers formed from a N-halogenated maleimide (N-HMI) monomer. The terpolymers can include three or more different types of monomers. Generally, the amounts and ratios of monomers can be selected to give the desired polymer. Examples of especially useful amounts are discussed below.

A. Components of the Terpolymer

To prepare the terpolymer, any N-halogenated phenyl maleimide units or phenyl bismaleimide units may be used as the first unit. The general structure of the N-halogenated phenyl maleimide unit is:

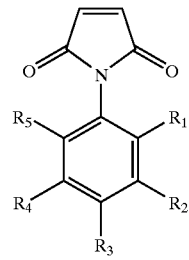

wherein
$R_1$=H, F, Cl, Br, $CF_3$, $C_2$-$C_8$ fluoroalkyl and fluoroaryl,
$R_2$=H, F, Cl, Br, $CF_3$, $C_2$-$C_8$ fluoroalkyl and fluoroaryl,
$R_3$=H, F, Cl, Br, $CF_3$, $C_2$-$C_8$ fluoroalkyl and fluoroaryl,
$R_4$=H, F, Cl, Br, $CF_3$, $C_2$-$C_8$ fluoroalkyl and fluoroaryl,
$R_5$=H, F, Cl, Br, $CF_3$, $C_2$-$C_8$ fluoroalkyl and fluoroaryl,
wherein at least one of $R_1$ to $R_5$ contains a halogen or a halogenated alkyl or aryl group.

Perfluoro groups are especially useful. Perfluoro groups have all hydrogens replaced by fluorine, but complete perfluorination is not necessary for the R groups. Examples of useful $R_1$–$R_5$ groups include but are not limited to include $CF_3$, $C_2F_5$, $C_3F_7$, etc, perfluoroalkyl groups and $C_6F_5$ perfluoroaryl groups.

Preferably, at least one of $R_1$–$R_5$ contains fluorine. More preferably, at least one of $R_1$–$R_5$ is fluorine, i.e., one, two, three or four of the $R_1$–$R_5$ moieties are fluorine.

The N-HMI monomer can be formed by techniques known in the art. For example, the following technique can be used to form a N-HMI monomer:

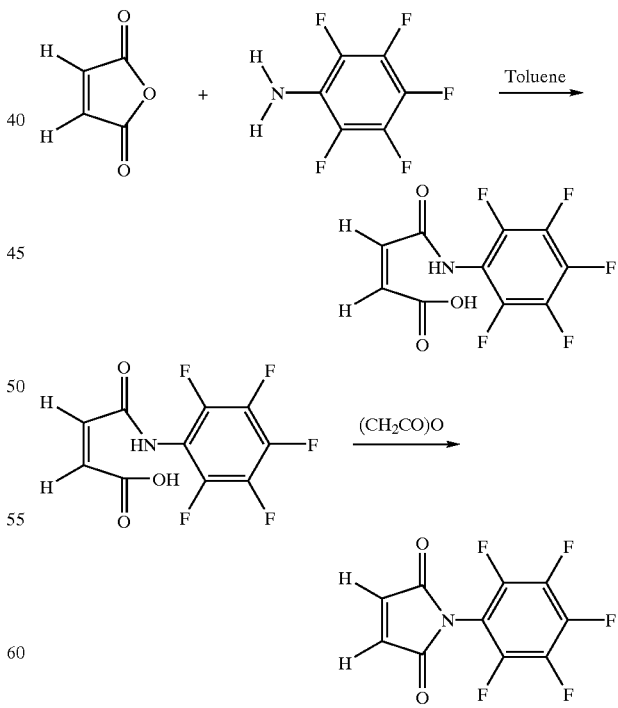

Instead of, or in addition to, the maleimide monomer, a difunctional bismaleimide can be used, and can be synthesized by an analogous approach. Useful bismaleimides are represented by the following structure, where the R groups are independently selected from H, F, Cl, Br, $CF_3$, $C_2$–$C_8$ fluoroalkyl or fluoroaryl groups, or any other halogen-containing group and at least one R is halogen or a halogenated group.

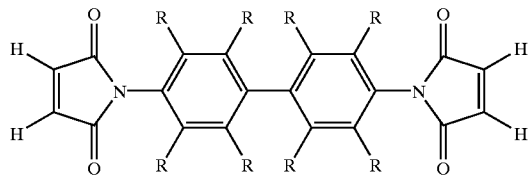

To make the terpolymers of the invention, N-HMI monomer is polymerized with one or more halogenated comonomers and one or more monomers containing both a free radically polymerizable group and a cationic ring opening polymerizable group. The monomers can be selected to produce a polymer with desired refractive index, for use in, e.g., microfabrication of polymer waveguides.

When forming the terpolymer, it can include any desired percentage of the N-halogenated phenyl maleimide unit, for example, from about 10–90% by weight, based on the weight of the terpolymer.

The second unit of the terpolymer comprises about 0–60% by weight of a halogenated monomer such as halogenated acrylates, halogenated styrenes, halogenated vinyl ethers, halogenated olefins, halogenated vinyl isocynates, halogenated N-vinyl amides, halogenated allyls, halogenated propenyl ethers, halogenated methacrylates, halogenated maleates, halogenated itaconates, halogenated crotonates and compounds of formula (IV):

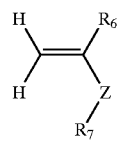

(IV)

wherein Z is O, S, OC(O), SCN, NC(O), C(O)O, C(O)N, SC(O) or halogenated phenyl and $R_6$ is hydrogen, halogen, alkyl or halogenated alkyl, and $R_7$ is an alkyl, halogenated alkyl, aryl or halogenated aryl.

The halogenated styrene that the N-HMI can also be polymerized with preferably has the following structure:

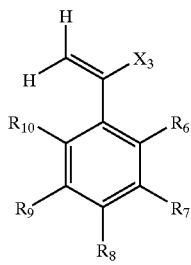

where, $R_6$–$R_{10}$ are independently H, F, Cl, Br, or $CF_3$, $X_3$=H, $CH_3$, $C_6F_5$, or $CF_3$, where at least one of the groups include a halogen. Any desired halogenated styrenes can be used.

The N-HMI can also be polymerized with, for example, 45–55% halogenated vinyl-ether 1–25% of fluorinated olefin, as recited above. Any desired fluorinated olefin can be used.

The monomers can be polymerized using any desired polymerization technique. The monomers can be polymerized in organic solvents or supercritical carbon dioxide matrices in the presence of a radical initiator. For example, N-HMI can be polymerized with fluorinated acrylate using a radical mechanism through UV irradiation or thermal radical initiation in bulk or in solution.

The third unit of the terpolymer comprises about 5–45% by weight of a monomer containing both a free radically polymerizable group and a cationic ring opening polymerizable group. The third component may preferably be represented by formula (V):

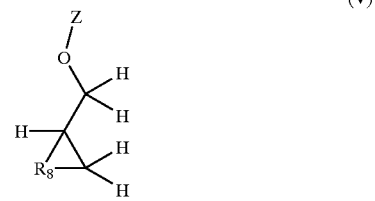

(V)

wherein $R_8$=O, S or $CH_2$—O, and Z is any free radical polymerizable group. Examples of the free radical polymerizable group include, but are not limited to, vinyl, acryl, methacryl, styryl, and maleic. It is particularly preferred that the third unit of the terpolymer comprises glycidyl methacrylate, glycidylacrylate, thioglycidylacrylate or thioglycidyl methacrylate.

B. Methods of Preparing the Terpolymers

The terpolymers of the invention can be prepared by known methods by those of ordinary skill in the art and will be further demonstrated by the examples. Typically, the terpolymers are prepared by solution radical polymerization with cycloketone or halogenated benzene as solvent at a temperature of 100–150° C. with 0.02–0.08 wt. % thermal initiator. In preferred process, the terpolymer was prepared by thermal, or photoinitiated radical copolymerization in solution or in bulk.

In one aspect of the invention the terpolymer is crosslinked by photolithography via UV radiation or E-beam radiation.

C. Methods of Preparing Optical Devices

The terpolymers are useful, for example, as optical devices, and have high thermal stability and low optical loss. In one aspect of the invention the optical devices comprise the terpolymers mixed with 0.1–2.0% by weight of a cationic photo initiator. Examples of optical devices which can use the inventive terpolymer include but are not limited to a polymer waveguide, a polymer optical power splitter, a polymer optical multiplex, a polymer optical demultiplex, a polymer optical coupler, a polymer thermal optical switch, a polymer thermal optical attenuator, a polymer wavelength bragg filter, a host material for a polymer planar amplifier and a polymer modulator.

The optical devices comprising the terpolymers may be prepared by one or more of the following steps: micro-photolithography, micro hot-embossing, micro-molding, spin-molding, UV curing, injection molding and spin-coating.

In a negative photolithographic process for forming an optical device using terpolymers of the invention, a cladding layer is produced by spin coating the polymeric material onto a substrate to form a film layer which is then soft-baked to remove solvent. Then the cladding layer is exposed to UV radiation, followed by postbaking to form a cross-linked structure. Then the core layer is spin-coated onto the cladding layer and soft baked to remove solvent. Both core and cladding material were prepared by radical co-polymerization in solvent as described in Example 1. The core material typically has a refractive index of 0.3–1.0% higher than that of the cladding layer. The core layer is then contacted to a negative photomask with patterns of waveguide structures. After UV radiation through the photomask followed by a post-baking process, the imaged area is crosslinked and the non-exposed area is washed away by a developing solvent (e.g., methyl ethyl ketone) thereby leaving the waveguide structure on the cladding layer. Following the development step, an overcladding is coated on the material, soft-baked to remove solvent, then further exposed to UV radiation and followed by a post-baking step.

In a hot-embossing and UV curing process for forming an optical device using terpolymers of the invention, a cladding layer is produced by spin coating the polymeric material onto a substrate to form a film layer which is then soft-baked to remove solvent followed by exposure to UV radiation and post-baking. The core material is then applied by spin coating the polymeric core material onto the cladding layer to form a film layer of core material which is then soft baked to remove solvent. The core material is then hot-embossed to form a waveguide pattern. This is done by heating up the core material to a temperature above the glass transition temperature of the core material and compressing (e.g., hot-embossing) the material under vacuum with a metal mold containing waveguide features. After demolding from the embossing tool, the core material is exposed to UV radiation and post-baked. Then, an over-cladding layer is coated onto the core material, pre-baked to remove solvent, then exposed to UV radiation and a post-baking step.

In an example of a hot-embossing process for preparing an optical device which comprises a terpolymer of the invention, a terpolymer is hot-embossed at a temperature above the glass transition temperature of the polymer with a metal mold, then the terpolymer is demolded, followed by a photocuring step with UV radiation and finally followed with a postbaking step to form the optical device.

In another example, an optical device comprising the terpolymer of the invention can be prepared by spin-coating the terpolymer on a silicon wafer, curing with UV radiation under a photomask, or directly writing using an electron beam, and then post-baking the terpolymer to crosslink the image area and subsequently developing with organic solvent to wash away non-image area thereby leaving the waveguide structure.

One of the optical devices that can be prepared by processing the inventive terpolymer is an optical waveguide. Using the highly fluorinated terpolymer material as a negative photoresist, a single mode optical waveguide structure can be fabricated from a microlithographic process by developing in a common organic solvent, such as methyl ethyl ketone (MEK). The same photoinitiator-containing terpolymer behaves like a plastic polymer, which makes it possible to manufacture the microstructure by a hot-embossing process, and thus be further crosslinked with UV radiation and postbaking to enhance the thermal stability (Tg) and reduce the CTE. The combination of both microfabrication processes enables a lot of complicated multiple-component devices and multiple-layer optical structures for future optical applications.

The invention is illustrated by the following Examples. The Examples do not limit the scope of the invention, but are for illustrative purposes only.

EXAMPLES

Example 1

Synthesis of Crosslinkable Maleimide Terpolymers

Preferred terpolymers of the present invention were synthesized by solvent (50% wt) copolymerization in chlorobenzene or cyclohexanone at 130° C. The monomer molar feeding ratio as well as the weight fraction is summarized in Table 1.

TABLE 5

Terpolymerization of Crosslinkable Maleimide Terpolymers

| Run No# | Monomer feeding ratio | Pentafluoro-phenyl maleimide | 1H, 1H, 2H, 2H,-heptadecafluoro-decyl acrylate | Glycidyl Methacrylate | Polymerization Solvent |
|---|---|---|---|---|---|
| MIC#1 | Molar (mol.) | 0.04 | 0.02 | 0.03 | Chlorobenzene |
|  | Weight (%) | 42.66 | 42.01 | 15.33 |  |
| MIC#2 | Molar (mol.) | 0.04 | 0.02 | 0.03 | Cyclohexanone |
|  | Weight (%) | 42.66 | 42.01 | 15.33 |  |
| MIC#4 | Molar (mol.) | 0.05 | 0.02 | 0.03 | Cyclohexanone |
|  | Weight (%) | 48.18 | 37.96 | 13.86 |  |
| MIC#5 | Molar (mol.) | 0.05 | 0.03 | 0.03 | Cyclohexanone |
|  | Weight (%) | 40.50 | 47.86 | 11.64 |  |
| MIC#6 | Molar (mol.) | 0.06 | 0.015 | 0.03 | Chlorobenzene |
|  | Weight (%) | 57.72 | 28.46 | 13.82 |  |
| MIC#7 | Molar (mol.) | 0.06 | 0.015 | 0.03 | Cyclohexanone |
|  | Weight (%) | 57.72 | 28.46 | 13.82 |  |

The pentafluorophenyl maleimide was prepared and purified through sublimation. The 1H,1H,2H,2H heptadecafluoro-decyl acrylate (Viscoat 17F or HDFDA) and glycidyl methacrylate (GMA) were purified by passing them through a silica-gel column to remove the inhibitor before use. The monomers, solvent, and radical initiator (0.5–0.6% wt) were placed into a 100 ml round-bottom flask. The reaction mixture was degassed three times by vacuum and replaced with nitrogen in order to remove the oxygen. The polymerization was carried out at 130° C. for 6 hours. The polymer was recovered by precipitation of the polymer solution into 500 ml absolute ethanol. The slight-pink solution was removed and washed with plenty of ethanol three times. The solid terpolymer was collected by suction filtration and dried in a vacuum oven at 60° C. overnight. The yield of copolymerization is 70–80% depending on the monomer feeding composition.

Example 2

Terpolymer Characterization

The terpolymer structure and terpolymer composition obtained in Example 1 was calculated from FTIR, $^1$H and $^{13}$C NMR spectra. From the $^1$H NMR spectra, the low field resonance peak from maleimide units was well distinguished. Quantitative $^{13}C$ NMR spectra were obtained with low relaxation time (45 s). From the DEPT experiments, the close self-spin lattice relaxation time ($T_1$) pair of carbon was selected for calculating the compostion. The glass transition temperature of solid powder polymer sample and curing kinetics from polymer film was determined from a DSC at a scan speed of 20° C./min in air. The terpolymer thin film samples for curing kinetics and photoresist evaluation were prepared by spin-coating process. The curing kinetics was followed by the absorption intensity of the epoxy group in the FTIR spectra. The refractive index and film thickness of terpolymer was detected from the Metricon® 2010 prism coupler at three different wavelengths.

Example 3

Photo Curing Behavior of Terpolymers

Monomers having one or more epoxy groups undergo a cationic polymerization in the presence of a Brönsted acid. Upon UV radiation, the photo initiator generates a strong Brönsted acid, the ring opening reaction between the pendant epoxy group in the polymer starts as long as the temperature reaches to the point in which polymer chain segment starts to move (Tg). Samples of the material from Example 1 for curing kinetics were prepared by the following process: 0.75% wt (based on the total weight of polymer) of triarylsulfonium hexafluoroantimonate was added into a polymer/methyl ethyl ketone (30–35% wt) solution. The polymer solution was spin coated (1500 rpm) on a 13 mm diameter potassium bromide crystal disc. All the discs were prebaked (soft baking) at 135° C. for three minutes, then exposed to a Fusion System D-lamp at a dosage of 2.0 J/cm². The samples were post-baked at 135° C., 150° C. and 165° C. for 1, 2, 5, and 10 minutes. The FTIR spectra were measured at 4 cm$^{-1}$ resolution and 32 scans with potassium bromide disc s reference. The specific absorption peaks of the epoxy group at 910–911 cm$^{-1}$ was used to determine the conversion. Carbonyl group absorption at 656 cm$^{-1}$ was used to normalize the film thickness.

Sample preparation for DSC measurement included the following procedure. A thick polymer film was formed by adding 20 mg (ca. 6 mg solid polymer) of polymer solution in a DSC aluminum pan and slowly evaporating the MEK. The film in the DSC pan was dried in a vacuum oven and treated by the same procedure as the sample for FTIR measurement (softbaking, UV radiation, postbaking at different temperatures). The DSC curves and FTIR data was analyzed in order to study the relationship between the degree of crosslinking and apparent glass transition temperature.

Example 4

Photoresist Evaluation

The polymer solution of the cladding layer was spin-coated onto a 4 inch diameter double polished silicon wafer with a controlled thickness of 5–8 $\mu$m. The cladding layer comprises a terpolymer as prepared by Example 1. The cladding layer is prepared by dissolving 30–45 wt % of the terpolymer in a ketone solvent, mixed with 0.5–1 wt % photoinitator.

The film was soft-baked to remove solvent at 135° C. for 3 minutes to improve the PI distribution and eliminate the inner stress. After exposing to 2.0 J/cm² UV radiation, the polymer film was fully cured by postbaking at 165° C. for 10 minutes.

The second 5–8 $\mu$m thick core polymer layer, designed for the core structure of waveguide with relatively high refractive index was spin-coated onto the first cured cladding layer. The core layer was soft-baked at 135° C. for 5 minutes. Then, using a mask, different areas of the film (14 mm o.d. spots) were exposed to a pulsed Xenon lamp for different lengths of time. Among the total 14 spots on each Si wafer, the UV dosage on each spot was adjusted by varying the exposure time to give dosages from 0 mJ/cm² to 360 mJ/cm². After post-baking at 165° C. for 10 mins, the polymer film was developed into a methyl ethyl ketone solution for 2 minutes. The wafer was then put into a fixer solution of 1:1 MEK/iso-propanol for 30 seconds. The imaged polymer film was dried in vacuum oven at 80° C. for 1 hour.

The FTIR spectrometer was used to determine the sensitivity and contrast of this negative photoresist. The core polymer thickness change vs. UV dosage was obtained from the absorption of the 995 cm$^{-1}$ peak using a non-exposed area (cladding layer) on the same wafer as a reference.

Example 5

Manufacture of Single Model Polymer Waveguide

Figure 13B:
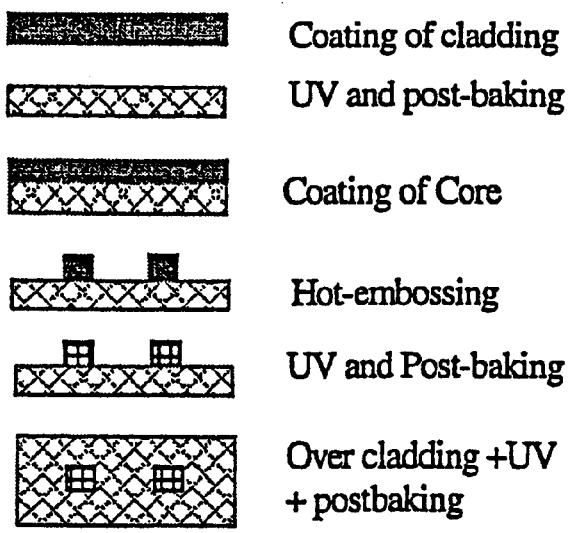
FIG. 13b is a scheme showing the process flow of polymer waveguides in a hot-embossing/UV curing process.

Both the photolithography and hot embossing microfabrication process were conducted in a Class 1000 clean room. The detailed process flow is schematically drawn in FIGS. 13(a) and 13(b). The first two steps of the bilayer process are exactly the same in both processes.

First a cladding layer was prepared by exactly the same procedure as the photoresist evaluation process in Example 4. The core layer was spin-coated on the cladding layer with a thickness control of 5–8 $\mu$m (in the single mode region), and soft-baked at 135° C. for three minutes. The core layer was then UV exposed through a waveguide photomask. The image of core structure on the cladding layer was obtained after post-baking the film at 165° C. for 3 minutes and developing the film in MEK for two minutes. Over cladding was applied to the core structure using the same terpolymer solution as the first cladding layer. The over cladding layer was fully cured with UV and postbaking.

The hot-embossing experiments involved the same bi-layer spin coating procedure as the photolithographic process. Instead of using a photomask to crosslink the micro waveguide patterns, a Si or Ni tool was used to emboss the thermoplastic core layer at a temperature 20° C. above the glass transition temperature, then demolded at 20° C. below the glass transition temperature. The hot-embossed microstructure was crosslinked by UV radiation and a postbaking process.

The photolithography and the hot-embossing processes may be combined using the same or different polymer materials to fabricate many optical devices.

The photography of waveguide structure was observed with a Nikon® optical microscope in bright field. The surface profile of waveguide structure, including the surface roughness was detected from WYCO diffractive optical microscope with scanning area of 120×120 $\mu$m or 60×60 $\mu$m.

Results and Discussion

A. Waveguide Design and Composition of a Preferred Terpolymer

The waveguiding condition can be described by the transverse resonance condition:

$$dk_o\gamma - \arctan(q_s\sigma/\gamma) - \arctan(q_c\sigma/\gamma) = m\pi (m=0,1,2 \ldots)$$

With $q_s = q_c = 1$ for $T_E$ modes (electronic transmission) and $q_s = (N_f/N_c)^2$ and $q_c = (N_c/N_s)^2$ for $T_M$ modes (magnetic transmission). The indices c, f, s represents the parameter for the cover, the substrate and the film respectively. The N represents the refractive index, $k_o=2\pi/\lambda_o$=vacuum vector. The parameters $\gamma$, $\sigma$ and $\alpha$ are given by:

$$\gamma=(N_f^2-N_{eff}^2)^{1/2}, \sigma=(N_{eff}^2-N_s^2)^{1/2}, \text{ and } \alpha=(N_{eff}^2-N_c^2)^{1/2}$$

In the case of a channel waveguide prepared by a photolithographic process with the fluorinated maleimide terpolymers d=the film thickness. The polymer substrate and overcladding are the same material with a refractive index of 1.433 ($N_c=N_f=1.433$). The relationship (see FIGS. 1a, 1b) between the effective refractive index, $N_{eff}$ and core thickness d from different modes m=0, 1, 2 . . . etc. can be calculated By adjusting the RI of the core material, 0.8% (FIG. 1a) and 0.5% (FIG. 1b) higher than the over cladding layer, the maximal film thickness of core layer is 7.3 μm and 5.0 μm respectively. When using a test negative photomask, 8 micron line width tool, to fabricate the waveguide structure, based on this calculation, an ideal single mode polymer waveguide would have a refractive difference between core and cladding of about 0.45%.

The particularly preferred three monomers selected in the copolymerization were utilized because PFPMI is a thermally stable low optical loss monomer (0.13 dB/cm at 1550 nm) with relative high polarity that renders the polymer good solubility. Furthermore, the high refractive index of the PFPMI polymer, 1.49 at 1550 nm, can be used to compensate the low refractive index of a fluorinated comonomer to match the single mode optical fiber (RI=1.444 at 1550 nm). Additionally, heptdecafluorodecyl acrylate (HDFDA) is a commercially available monomer with a low optical loss (0.18 dB/cm at 1550 nm) and a low refractive index in the near IR region. Lastly, glycidyl methacrylate (GMA) contains two reactive functional groups suitable for two different steps of polymerization mechanism, radical and cationic polymerization.

The present inventors have determined that although solution radical polymerization at 90° C. has a lower yield, a homogeneous composition in terms both of molecular weight and composition is produced. High temperature (140° C.) bulk polymerization improves the yield but produces a heterogeneous terpolymer that causes an optical problem resulting from phase separation and birefringence. Therefore, the present inventors determined that a high temperature solution polymerization to prepare the terpolymer would be particularly advantageous. Chorobenzene is preferred as the solvent for the high temperature polymerization because of its low chain transfer constant and good solubility for many polymers. A relatively short polymerization time, is required for polymerization, e.g., 4–6 hours is enough to finish the polymerization because the half life of the preferred thermal initiator, 2,5-dimethyl-2,5 di(tert-butylperoxy)-hexane in chlorobenzene is one hour at 134° C. However, the inventors have found that the terpolymer has a poor solubility in chlorobenzene when the feed ratio of HDFDA is as low as of 28.46% wt (see MIC# 6 of Table 5. The terpolymer forms micelles and eventually precipitates from the solvent. Conversely, cyclohexanone dissolves the terpolymer at as high a concentration as 47.86 wt % HDFDA feeding. This excellent solubility of the fluorinated maleimide terpolymer in ketone plays a role in the photolithographic process.

The refractive index of an individual polymer can be adjusted by changing the monomer feeding of PFPMI (RI=1.49) and HDFDA (1.38) and fixing the GMA concentration at a low weight percentage level (<15 wt %). An FTIR spectra of the resulting polymer composition (see FIG. 2) shows that the predicted refractive index for the waveguide cladding and core based on refractive index/polymer composition calculations are comparable. The normalized absorption peaks from the fluorocarbon stretch (1140–1240 cm$^{-1}$), and the phenyl ring absorption from maleimide unit (~1520 cm$^{-1}$) in these terpolymers reflect the same order of relative concentration as the monomer feeding.

Determining the terpolymer composition by NMR is complex. The $^1$H NMR of the terpolymer contains several overlapping peaks with a chemical shift in the 1–5 ppm range (see FIG. 3a). In this spectrum, only PFPMI can be resolved from the low field resonance peak at 4.5 ppm. The $^{19}$F NMR spectra was used to determine the relative concentration of maleimide and HDFDA. A quantitative $^{13}$C NMR spectrum of the same terpolymer is presented in FIG. 3c. With the use of $^{13}$C DEPT (FIG. 3b) experiments, the assignment of each $^{13}$C NMR peak is summarized in Table 1 In order to get a more accurate value of terpolymer composition, a combination of $^1$H and $^{13}$C and $^{19}$F NMR spectra results were used to calculate the composition based on the following equation 1–4

$$2X/(7Y+10Z)A_{4.55\ ppm}/(A_{1-5\ ppm}-A_{4.5\ ppm})\ (^1\text{H NMR}) \quad (1)$$

$$Y/Z=A_{57\ ppm}/A_{66\ ppm}\ (^{13}\text{C NMR}) \quad (2)$$

$$X/Y=A_{(-140-165\ ppm)}/A_{(-112-128\ ppm)}\ (^{19}\text{F NMR}) \quad (3)$$

$$X+Y+Z=10\ \text{(Composition)} \quad (4)$$

Here X, Y, Z represent the molar fraction of PFPMI, HDFDA and GMA in terpolymer respectively (Scheme 1). The pair of similar carbon —OCH$_2$ (C16 and C22 in Scheme 1) from HDFDA and GMA was selected for quantitative analysis because they have very similar spin lattice delay time (Ti) as illustrated from DEPT spectra (FIG. 3b).

TABLE 1

$^{13}$C NMR Assignment of Fluorinate Maleimide Terpolymer

| No. of Carbon | Chemical Shift (ppm) | No. of Carbon | Chemical Shift (ppm) | No. of Carbon | Chemical Shift (ppm) |
|---|---|---|---|---|---|
| 1 | 142.38 | 8 | 117.15 | 19 | 49.2 |
| 2 | 143.56 | 9 | 111.13 | 20 | 44.39 |
| 3 | 138.01 | 10–12 | 110.78 | 21 | 48.85 |
| 4 | 106.82 | 13 | 110.26 | 22 | 65.94, 66.58 |
| 5, 17, 23 | 173.05, 174.39, 174.88 | 14 | 108.45 | 24 | 44.8 |
| | | 15 | 30.19 | 25 | 42 |
| 6 | 42 | 16 | 56.90, 57.56 | 26 | 19 |
| 7 | 117.56 | 18 | 42 | | |

Scheme 1: structure of a preferred crosslinkable maleimide terpolymer

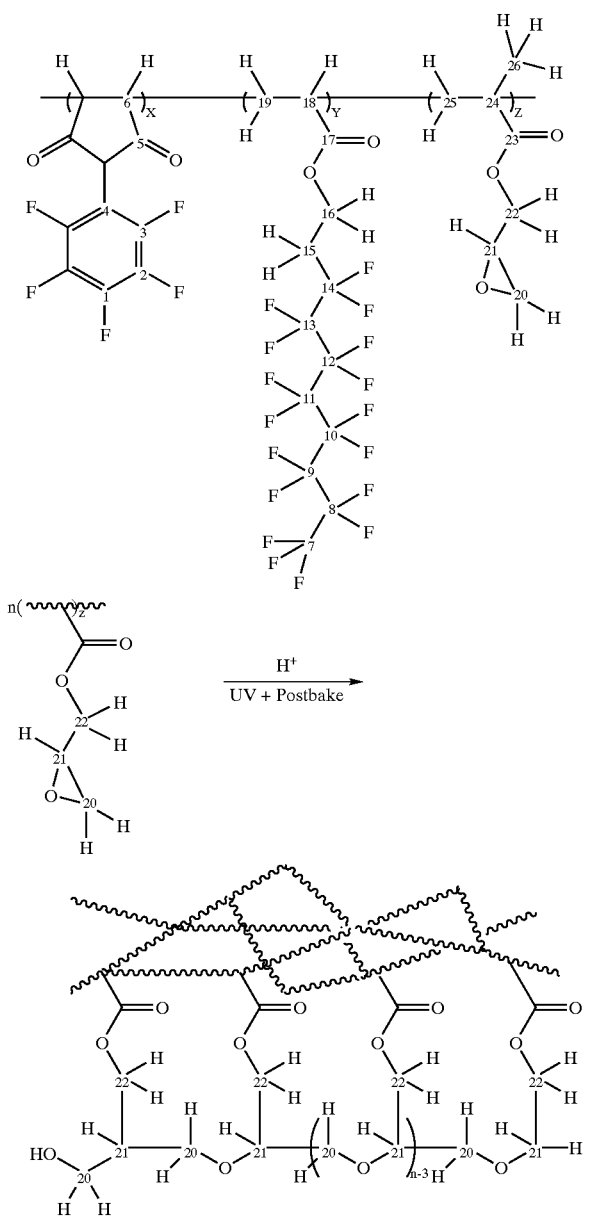

Characterization results of terpolymer composition, refractive index and glass transition temperatures are listed in Table 2. The refractive index difference between MIC#1 and MIC#7 is 0.8%, which enables fabrication of a single mode waveguide with a channel dimension of 5×5 μm.

TABLE 2

Terpolymer Composition and Their Properties.

| Run No. | Composition (mol %) | | | Tg (° C.) | Refractive Index @ 1.541 μm |
|---|---|---|---|---|---|
| | PFPMI | Viscoat 17F | GMA | | |
| MIC#1 | 0.428 | 0.256 | 0.316 | 110 | 1.4323 |
| MIC#2 | — | — | — | 113 | ~1.43* |
| MIC#4 | 0.430 | 0.216 | 0.354 | 115 | 1.4342 |
| MIC#5 | — | — | — | 96 | ~1.41* |
| MIC#6 | — | — | — | 130 | ~1.44* |
| MIC#7 | — | — | — | 134 | 1.4430 |

*Estimated from composition and polymerization condition

B. Curing Kinetics and Properties of Materials

Photolithography processes involve delicate procedures, such as the selection of spin-coating (film thickness) process, soft baking temperature, UV dosage, post-baking temperature and choice of developing solvent, etc. All of these parameters must be considered to optimize the process conditions to fabricate an optical device, e.g., a polymer waveguide, having high resolution and contrast. Curing kinetics have been measured by FTIR spectra based on the intensity change of the epoxy peak at 911 $cm^{-1}$. FIG. 4 is an example of the MIC#2 under the different post-baking time at 150° C. By using the C~O peak as the internal standard, the intensity of epoxy group peak at 911 $cm^{-1}$ decreases, which reflects a progressing of the epoxy group conversion with baking time.

The curing kinetics were monitored at four different temperatures, 135° C., 150° C., 165° C. and 180° C. From the epoxy conversion curves (see FIG. 5), after postbaking at 165° C. for ten minutes, the curing degree of the epoxy has stopped at a level of 70–72% which is an indication of saturated curing degree. No further curing has been observed when the sample was postbaked at 180° C. for 10 mins. Because all the samples were prepared under the same condition with the same concentration of photoacid initiator and the same exposure to UV radiation (2.0 $J/cm^2$), the curing speed at different temperatures can be determined from the slope of conversion curve at time equal to zero. According to the Arrhenius plot, the epoxy curing activation energy is as low as 13–14 KJ/mol. It is expected that a thermal curing reaction will occur in this polymer even without photo-initiator, which was detected by DSC at a temperature of 220° C. from pure terpolymer powder. This temperature is far higher than the postbaking temperature in a photolithographic process with the inventive terpolymer.

The curing kinetics confirmed that the cationic polymerization of the epoxy group in the maleimide terpolymer matrix is a fast curing, low activation energy process even in the presence of a very non-polar comonomer unit like HDFDA. While not being bound to any one theory, it is believed that this high reactivity is mainly attributed to the strong polarity of electron withdrawing groups from PFMI units and the alternating sequence distribution of this polymer. This improves the photo initiator distribution in the polymer matrix and also stabilizes the cationic intermediate stage of the epoxy species in the chain propagation process. From both the molar percentage of GMA in MIC#4 and the epoxy conversion of curing reaction, it is possible to calculate the degree of crosslinking in the final material ca. 24±1%.

The thermal analysis of the post-cured sample at different degrees of crosslinking was investigated to determine the correlation between the degree of crosslinking and the glass transition temperature. The DSC curves of MIC#4 samples at different baking times at 150° C. is presented in FIG. 6.

An exothermal peak due to curing of the rest of epoxy group is seen from all the samples. The peak position moves to higher temperature as the postbaking time is prolonged, while the curing entropy decreases. Increasing the postbaking time leads to a more crosslinked polymer chain which enhances the glass transition temperature of the terpolymer.

To measure a glass transition temperature of a thermally reactive system is complex because the glass transition temperature is a function of curing degree. The polymer chain segments gain mobility as the temperature approaches the glass transition temperature. In DSC analysis, the onset curing temperature indicates that the epoxy group begins to move and react, which could be used to estimate the maximal glass transition (Tg max.) of the terpolymer. The maximum glass transition temperature of different degrees of epoxy conversion samples was plotted in FIG. 7. The linear dependence of the glass transition vs. curing degree agrees with the theoretical prediction. The saturated crosslinked (24%) terpolymer pushes the maximal glass transition temperature to approximately 180° C., which is about 65° C. higher than that of the original linear terpolymer.

The refractive index change of the postcured polymers were measured by Metricon® and are summarized in Table 3. Examination of the data in Table 3 and FIG. 8 reveals that the refractive index of the crosslinked material actually becomes 0.12% lower on full cure. This is contrast to many other crosslink reactions, in which the refractive index normally increases more than 1% because of volume shrinkage. This small increase in the refractive index variation means that the curing process induced a very small volume expansion due to the opening of the constrained epoxy ring.

TABLE 3

Refractive Index Change of MIC#4 during the Curing Reactions

| Postbaking Temp. (° C.) | Postbaking Time (mm.) | Crosslink Degree (%) | Refractive Index at 1300 nm | Refractive Index at 1541 nm | Film Thickness ($\mu$m) |
| --- | --- | --- | --- | --- | --- |
| 135 | 0 | 0 | 1.4355 | 1.4342 | 7.88 |
| 135 | 2 | 3.2 | 1.4338 | 1.4338 | 5.29 |
| 135 | 5 | 9.8 | 1.4337 | 1.4324 | 8.87 |
| 135 | 10 | 14.1 | 1.4343 | 1.4329 | 9.11 |
| 150 | 2 | 6.5 | 1.4340 | 1.4326 | 9.56 |
| 150 | 5 | 15.1 | 1.4333 | 1.4323 | 8.81 |
| 150 | 10 | 18.0 | 1.4335 | 1.4325 | 8.82 |
| 165 | 2 | 12.9 | 1.4333 | 1.4322 | 7.01 |
| 165 | 5 | 19.8 | 1.4331 | 1.4322 | 6.92 |
| 165 | 10 | 22.3 | 1.4333 | 1.4325 | 7.99 |

C. Photoresist Evaluation and Photolithography Processes

By determining the curing kinetics of the epoxy curing reaction in this flourinated maleimide terpolymer system, the terpolymer can be evaluated as a negative photoresist. The polymer was pre-baked at ca. 10–20° C. above the Tg, UV irradiated through a mask and then postbaked at ca. 40–50° C. above the glass transition temperature of the linear terpolymer. From the FTIR studies, the sensitivity curve of the core polymer, MIC#2, is presented in FIG. 9. MEK was used as the developing solvent. Within a very broad UV dosage region, 1.2 mJ/cm$^2$ to 360 mJ/cm$^2$, MIC# 2 exhibits a very good sensitivity, ca. 9.8 mJ/cm$^2$ and a reasonable contrast of 1.5. In general, a heavily fluorinated acrylate, such as Viscoat 17F. has very poor solubility and low polarity, therefore, both the sensitivity and contrast could be improved if we change to a shorter fluorocarbon side chain acrylate comonomer.

The present inventors determined that optimal developing conditions by investigating several process conditions including postbaking temperature and time of cladding layer, post-baking temperature and time of core layer, developing time and developing solvents. The experimental results from our observations are listed in Table 4.

TABLE 4

Experimental Results of Photolithographic Process Test

| Postbaking of Cladding layer | | Postbaking of Core layer | | | |
| --- | --- | --- | --- | --- | --- |
| Temp. (° C.) | Time (mins.) | Temp. (° C.) | Time (mins.) | Developing Solvent | Observation results |
| 165 | 10 | 165 | 10 | MEK | Good resolution* |
| 165 | 10 | 165 | 10 | Cyclo-pentanone | OK resolution |
| 165 | 10 | 165 | 10 | 1,3 pentadione | OK resolution |
| 165 | 10 | 165 | 10 | MEK/hexane (3/1) | Under-developed |
| 165 | 5 | 165 | 10 | MEK | Good resolution |
| 165 | 2 | 165 | 10 | MEK | Under-developed |
| 150 | 10 | 165 | 10 | MEK | OK resolution |
| 150 | 5 | 165 | 10 | MEK | Under-developed |
| 165 | 10 | 165 | 5 | MEK | Slight swelling |
| 165 | 10 | 165 | 2 | MEK | Significant swelling |
| 165 | 10 | 180 | 5 | MEK | OK* resolution |
| 165 | 10 | 180 | 10 | MEK | OK* resolution |
| 165 | 10 | 150 | 5 | MEK | Significant swelling |
| 165 | 10 | 150 | 10 | MEK | Significant swelling |

*some times adhesion failure (i). The material containing more fluorinated acrylate comonomer possessed poorer contrast and sensitivity. Upon testing MIC#4 and MIC#2 under parallel process conditions, the higher fluorinated terpolymer, MIC#4 consistently appeared to be underdeveloped.

(ii). Adhesion failure between the core and cladding layer occurs if the cladding layer contains more Viscoat 17F. (heptadecafluorodecylacrylate) and is fully cured. This is attributed to surface segregation of the low surface tension flourocarbon groups resulting in poor adhesion. Due to the poor solubility of the highly fluorinated cladding surface in MEK and the low diffusion coefficient of the highly crosslinked cladding layer, interactions between the core and cladding layers during the spin coating, prebaking, and postbaking process of the core layer are reduced. Therefore, lower adhesion between the two layers is observed.

(iii). Reduced postbaking temperature and time of cladding layer dramatically improved the adhesion between core and cladding, but it also creates an under-develop problem (FIG. 10) because the core layer swells the cladding layer and photoinitiator can diffuse into the core layer during the baking process.

(iv). Reducing postbaking temperature and time of the core layer can improve the sensitivity. But during the developing process, the non-fully crosslinked terpolymer has more problem related to the swelling of micro-features.

(v). Among the several test solvents, methyl-ethyl ketone (MEK) is one of the preferred solvents due to its solubility for the terpolymer. MEK is also less likely to remain in the core structure because of its lower boiling point versus use of solvents cyclopentanone, cyclohexanone, or 1,3 pentadione. The solvent/nonsolvent mixture does not show any positive contribution on the feature image.

D. Polymer Waveguide Structure

Under the preferred conditions, a single mode waveguide structure (5×8 µm, height×width) has been fabricated from a lithographic process according to the invention. The micrographic picture of the waveguide structure is shown in FIG. 11. Based on the surface profile analysis of the two dimensional image, the top surface roughness (Ra) of the waveguide is 0.04 µm, the surface roughness of cladding layer is almost the same as the waveguide. The area roughness from both the waveguide surface and waveguide bottom value is better than the requirements of Ra<0.1 µm based on the loss simulation from surface scattering. FIG. 11 shows that there are some traces of microstructure appearing at the cladding surface. It is theorized that a possible microphase separation or micellization occurred during the slow spin-coating process with heavily fluorinated material (100 rpm/s acceleration to 1500 rpm). The width of the waveguide is exactly the same as the line width of the photomask, which means no apparent solvent swelling occurred in the core structure. The vertical side-wall from straight waveguide (FIG. 11) indicates a relatively good contrast under this process condition.

The hot embossing process, as illustrated in FIG. 12, was also tested on terpolymer MIC#4. The hot embossing tool was made from a silicon wafer (four inches o.d.) by the following process. First, 8 µm line width channels were fabricated by using a positive photoresist on a silicon wafer, then the channels were reactive ion etched into the silicon wafer to the depth of 5 µm. After washing away the photoresist, a 5×8 µm channel structure was obtained with the side wall angle ca. 85 degree. The hot-embossing process was carried out on a JenOptik® hot embossing machine, loading with the silicon wafer mold and a contact force of 25 KN. The molding and demolding temperature was 135° C. and 95° C. respectively. The 3D image of the straight waveguide (4.5×8 µm) is shown in FIG. 11. The surface roughness (Ra) is as small as 0.012 µm from the 2D-profile analysis, which is almost three times smaller than that of the photolithography process. The flash core layer above the cladding is less than 0.5 µm. Therefore, the quality of this structure is sufficient to prepare a ridge polymer waveguide because the flash layer thickness is only 10% of total the waveguide height. A similar hot-embossing process at the polymer glass temperature of ca. 115° C. failed to produce a waveguide structure because of the very high viscosity of the polymer at the Tg. Under UV radiation and postbaking, by gradually increasing the temperature to 50° C. above Tg, the microstructure became solvent resistant and stable without any change in the surface roughness. The side wall and waveguide edge look smooth because of the softening/and crosslinking processes.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Other embodiments of the invention will be apparent to those skilled in the art from consideration of the specification and practice of the invention disclosed herein. It is intended that the specification be considered as exemplary only, with the true scope and spirit of the invention being indicated by the following claims.

As used herein and in the following claims, singular articles such as "a", "an", and "one" are intended to refer to singular or plural.

What is claimed is:

1. A terpolymer containing N-halogenated phenyl maleimide units or phenyl bismaleimide units (I), one or more second units (II) selected from the group consisting of halogenated acrylates, halogenated styrenes, halogenated vinyl ethers, halogenated olefins, halogenated vinyl isocyanates, halogenated N-vinyl amides, halogenated allyls, halogenated propenyl ethers, halogenated methacrylates, halogenated maleates, halogenated itaconates, halogenated crotonates, and compounds of formula (IV):

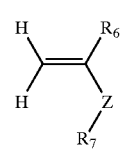

IV wherein Z is O, S, OC(O), SCN, NC(O), C(O)O, C(O)N, SC(O) or halogenated phenyl and $R_6$ is hydrogen, halogen, alkyl or halogenated alkyl and $R_7$ is an alkyl or halogenated alkyl, aryl or halogenated aryl, and one or more third units (III) comprising a monomer containing both a free radically polymerizable group and a cationic ring opening polymerizable group, wherein the terpolymer is prepared by radical polymerization.

2. The terpolymer of claim 1, wherein the first unit (I) comprises a maleimide of the formula:

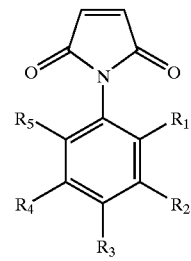

wherein
$R_1$=H, F, Cl, Br, $CF_3$, $C_2$–$C_8$ fluoroalkyl and fluoroaryl,
$R_2$=H, F, Cl, Br, $CF_3$, $C_2$–$C_8$ fluoroalkyl and fluoroaryl,
$R_3$=H, F, Cl, Br, $CF_3$, $C_2$–$C_8$ fluoroalkyl and fluoroaryl,
$R_4$=H, F, Cl, Br, $CF_3$, $C_2$–$C_8$ fluoroalkyl and fluoroaryl,
$R_5$=H, F, Cl, Br, $CF_3$, $C_2$–$C_8$ fluoroalkyl and fluoroaryl,
wherein at least one of $R_1$ to $R_5$ contains a halogen or a halogenated alkyl or aryl group.

3. The terpolymer of claim 2, wherein the halogenated phenyl maleimide is pentafluoro phenyl maleimide.

4. The terpolymer of claim 1, wherein the second unit (II) is selected from the group consisting of halogenated acrylates, halogenated styrenes, halogenated vinyl ethers, halogenated olefins, halogenated vinyl isocynates, halogenated N-vinyl amides, halogenated allyls, halogenated propenyl ethers, halogenated methacrylates, halogenated maleates, halogenated itaconates, and halogenated crotonates.

5. The terpolymer of claim 4, wherein the one or more second unit is a fluorinated acrylate.

6. The terpolymer of claim 1, wherein third component (III) is a bifunctional comonomer containing both free radically polymerizable group and a cationic ring opening polymerizable group.

7. The terpolymer of claim 6, wherein the third component is represented by formula (V):

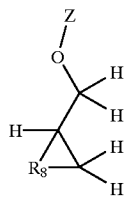

wherein $R_8$=O, S or CH2-O, and Z is a free radical polymerizable group.

8. The terpolymer of claim 7, wherein the free radical polymerizable group is selected from the group consisting of vinyl, acryl, methacryl, styryl, and maleic.

9. The terpolymer of claim 5, wherein the third unit is selected from the group consisting glycidyl methacrylate, glycidyl acrylate, thioglycidyl acrylate and thioglycidyl methacrylate.

10. The terpolymer of claim 9, wherein the third unit is glycidyl methacrylate.

11. A process of preparing a terpolymer as claimed in claim 1, wherein the terpolymer is prepared by thermal or photoinitiated radical copolymerization in solution or bulk.

12. A process of preparing an optical device from the terpolymer of claim 1, wherein said process comprises subjecting the terpolymer to one or more steps selected from the group consisting of micro-photolithography, micro hot-embossing, micro-molding, spin-molding, UV or electron beam curing, injection molding and spin-coating.

13. The process of claim 12, wherein the terpolymer is crosslinked by photolithography via UV radiation or E-beam radiation.

14. The process of claim 12, comprising hot embossing the terpolymer at a temperature above the glass transition temperature of the polymer with a metal mold, and further comprising demolding the terpolymer, photocuring the terpolymer with UV radiation and postbaking the terpolymer to form a crosslinked polymer.

15. The process of claim 12, comprising spin-coating the terpolymer on a silicon wafer, curing with UV radiation under a photomask, and further comprising post-baking the terpolymer to crosslink the image area and subsequently developing with organic solvent to wash away non-image area thereby leaving the waveguide structure.

16. The process of claim 12, wherein the terpolymer is mixed with 0.1–2.0% by weight of a cationic photo initiator.

17. The process of claim 13, wherein E-beam radiation is used to crosslink the terpolymer.

18. A process of preparing an optical device comprising one or more of the processes as claimed in any of claims 13–15 or 17.

19. An optical device comprising the terpolymer of claim 1, which is selected from the group consisting of a polymer waveguide, a polymer optical power splitter, a polymer optical multiplex, a polymer optical demultiplex, a polymer optical coupler, a polymer thermal optical switch, a polymer thermal optical attenuator, a polymer wavelength bragg filter, host material for a polymer planar amplifier and a polymer modulator.

20. An optical device prepared by the process according to claim 12.

21. An optical device prepared by the process according to claim 14.

22. An optical device prepared by the process according to claim 15.

* * * * *